US008532386B2

(12) United States Patent
Umeda et al.

(10) Patent No.: US 8,532,386 B2
(45) Date of Patent: Sep. 10, 2013

(54) ELECTRONIC DOCUMENT PRODUCING DEVICE, ELECTRONIC DOCUMENT PRODUCING METHOD AND STORAGE MEDIUM

(75) Inventors: Ichiro Umeda, Tokyo (JP); Tetsuomi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1046 days.

(21) Appl. No.: 12/388,417

(22) Filed: Feb. 18, 2009

(65) Prior Publication Data

US 2009/0297027 A1 Dec. 3, 2009

(30) Foreign Application Priority Data

Feb. 19, 2008 (JP) .................. 2008-037774

(51) Int. Cl.
*G06K 9/00* (2006.01)
*G06K 9/34* (2006.01)

(52) U.S. Cl.
USPC .......................................... 382/181; 382/178

(58) Field of Classification Search
USPC ................................ 382/181–231
See application file for complete search history.

(56) References Cited

U.S. PATENT DOCUMENTS

| 5,687,253 A * | 11/1997 | Huttenlocher et al. ....... 382/177 |
| 5,825,943 A | 10/1998 | DeVito |
| 5,867,277 A | 2/1999 | Melen |
| 7,903,876 B2 * | 3/2011 | Zandifar et al. ............. 382/176 |
| 2005/0175239 A1 * | 8/2005 | Araki et al. .................. 382/177 |

FOREIGN PATENT DOCUMENTS

| EP | 0017090 | 10/1980 |
| EP | 0710003 | 5/1996 |
| EP | 1215881 | 6/2002 |
| EP | 1235181 | 8/2002 |
| EP | 1333656 | 8/2003 |
| EP | 1465105 | 10/2004 |
| JP | S60-65668 | 4/1985 |
| JP | 06-103411 | 4/1994 |
| JP | H7-93374 | 4/1995 |
| JP | H8-63583 | 3/1996 |
| JP | 2002-77578 | 3/2002 |
| JP | 20070172227 | 7/2007 |

* cited by examiner

*Primary Examiner* — Alex Liew
(74) *Attorney, Agent, or Firm* — Carter, DeLuca, Farrell & Schmidt LLP

(57) ABSTRACT

An electronic document producing device has a correcting unit for correcting distortion of a first image to obtain a correction image, and a character recognition unit for executing character recognition processing on a plurality of character images contained in the correction image to obtain text data. The device also has a unit for finding a base line of each character row in the first image, and a unit for finding a relative position from the base line in regard to each character image in the first image. The device also includes a producing unit for producing an electronic document including the text data and the first image, wherein a position of the text data is described based on the relative position from the base line.

9 Claims, 36 Drawing Sheets

FIG. 7B

調補正では、中間転写ベルト上に各色の色パッチを形成、高精度濃度センサRRPSセンサで読み取り、自動補正します。この2つの技術によ

FIG.10A off, the focus setting will Center] are available.

FIG.10B

```
<</Length 604>> stream
q         q   BT   /F2   10.5   Tf   0   Ts   0   Tr   72   745.3125   Td
[<c4b4cae4c0b5a4c7a4cfa1a2c3e6b4d6>
Tj <c5be>
Tj <bccc>
Tj <a5d9>
Tj <a5eb>
Tj <a5c8>
Tj <bee5>
Tj <a4cb>
Tj <b3c6>
Tj <bfa7>
Tj <a4ce>
Tj <bfa7>
Tj <a5d1>
Tj <a5c3>
]
```

FIG.13A

```
<</Length 604>> stream
 q    q BT /F2 10.5 Tf 0 Ts 0 Tr 72 745.3125 Td [

-- omitted --

調補正では、中間転写ベルト上に各色の色パッチを形成、高精度濃度センサ RRPS センサで読み取り、自動補正します。この２つの技術によ

FIG.14A off, the focus setting will Center] are available.

FIG.14B

```
<</Length 604>> stream
 q           q  BT  /F2  10.5  Tf  0  Ts  0  Tr  72  745.3125  Td
[<c4b4cae4c0b5a4c7a4cfa1a2c3e6b4d6>
Tj <c5be>
Tj <bccc>
Tj <a5d9>
Tj  93.7 Tz<a5eb>
Tj  87.5 Tz<a5c8>
Tj  87.5 Tz<bee5>
Tj  75.0 Tz<a4cb>
Tj  75.0 Tz<b3c6>
Tj  72.5 Tz<bfa7>
Tj  68.7 Tz <a4ce>
Tj  68.7 Tz<bfa7>
Tj  62.5 Tz<a5d1>
Tj  56.2 Tz <a5c3>
]
```

FIG.15A

```
<</Length 604>> stream
 q    q BT /F2 10.5 Tf 0 Ts 0 Tr 72 745.3125 Td [

-- omitted --

調補正では、中間転写ベルト上に各色の色パッチを形成、高精度濃度センサ RRPS センサで読み取り、自動補正します。この２つの技術によ

FIG.16A ff, the focus setting will

FIG.16B

```
<</Length 604>> stream
  q         q  BT  /F2  10.5  Tf  0  Ts  0  Tr  72  745.3125  Td
[<c4b4cae4c0b5a4c7a4cfa1a2c3e6b4d6>
Tj -0.5 Ts <c5be>
Tj -1 Ts <bccc>
Tj -2.4 Ts <a5d9>
Tj -2.64 Ts 93.7 Tz<a5eb>
Tj -3.6 Ts 87.5 Tz<a5c8>
Tj -4.8 Ts 87.5 Tz<bee5>
Tj -6.0 Ts 75.0 Tz<a4cb>
Tj -7.2 Ts 75.0 Tz<b3c6>
Tj -8.4 Ts 72.5 Tz<bfa7>
Tj -9.36 Ts 68.7 Tz <a4ce>
Tj -10.2 Ts 68.7 Tz<bfa7>
Tj -11.4 Ts 62.5 Tz<a5d1>
Tj -12 Ts 56.2 Tz <a5c3>
]
```

FIG.17A

```
<</Length 604>> stream
 q    q BT /F2 10.5 Tf 0 Ts 0 Tr 72 745.3125 Td [

-- omitted --

調補正では、中間転写ベルト上に各色の色パッチを形成、高精度濃度センサ RRPS センサで読み取り、自動補正します。この2つの技術によ

FIG.18A ff, the focus setting will

FIG.18B

調補正では、中間転写ベルト上に各色のパッチを形成、高精度濃度センサRRPSセンサみ取り、自動補正します。この２つの機り、色ズレや画像濃度のブレに対する

FIG.19A

ELECTRONIC DOCUMENT PRODUCING DEVICE, ELECTRONIC DOCUMENT PRODUCING METHOD AND STORAGE MEDIUM

BACKGROUND OF THE INVENTION

1. Field of the Invention

This invention generally relates to an electronic document producing device, an electronic document producing method, and a storage medium, which produce a searchable electronic document from an image having distortion.

2. Description of the Related Art

Various conventional methods have been proposed in regard to the correction of a scanned image. Japanese Patent Laid-Open No. S60-65668 (1985) discloses a method of correcting curvature distortion in a bind-in portion of a book. Japanese Patent Laid-Open No. 2002-77578 discloses a method of performing correction of an image for correcting distortion of a photographed image generated due to unevenness in height of a photographing object face by using a distance between upper and lower ends of a manuscript, a distance between an imaging device and the manuscript, and a relative position of the imaging device.

Japanese Patent Laid-Open No. H7-93374 (1995) discloses technology in which character recognition processing is executed on a document image, and the test data as the character recognition result is in advance associated with coordinate information showing a corresponding position of the text data on the document image. Further, upon searching the text, a document image page containing a portion corresponding to the searched text is displayed. In addition, Japanese Patent Laid-Open No. H8-63583 (1996) discloses technology in which text data as a result of executing character recognition processing on a document image is in advance associated with the document image a resolution of which is reduced, and registering the associated result, thus making it possible to produce a searchable document.

In the image correction method according to Japanese Patent Laid-Open No. S60-65668 (1985) and Japanese Patent Laid-Open No. 2002-77578, however, distortion is further generated in the image after the correction due to the correction error that is generated by an estimation error in distortion correction conversion, which may possibly further generate image quality degradation. That is, when the distortion correction processing is executed, further distortion may possibly be generated by the estimation error or the like. Therefore, for a user, there is the possibility that the image after the distortion correction may be more difficult to recognize than the image before the correction.

On the other hand, when character recognition processing is executed on a document image containing distortion, the accuracy of extracting characters from the document image may be deteriorated. As a result, it can occur that character recognition accuracy of an entire document image may be deteriorated.

SUMMARY OF THE INVENTION

According to one embodiment of the invention, an electronic document producing device is provided that has a correcting unit for correcting distortion of a first image to obtain a correction image; a character recognition unit for executing character recognition processing on a plurality of character images contained in the correction image to obtain text data; a unit for finding a base line of each character row in the first image; a unit for finding a relative position from the base line in regard to each character image in the first image; and a producing unit for producing an electronic document including the text data and the first image, wherein a position of the text data is described based on the relative position from the base line.

Further features of the present invention will become apparent from the following description of exemplary embodiments (with reference to the attached drawings).

BRIEF DESCRIPTION OF THE DRAWINGS

FIG. 7B is a drawing showing a part of an example of a distortion correction image obtained by performing distortion correction conversion on the upright image.

FIG. 10A is a drawing showing an example of text obtained from the text region shown in FIG. 9A.

FIG. 10B is a drawing showing an example of text obtained from the text region shown in FIG. 9B.

FIG. 13A is a drawing showing an example of a PDF description of a text object setting a base line and a default character width.

FIG. 13B is a drawing showing an example of a PDF description of a text object setting a base line and a default character width.

FIG. 14A is a drawing showing a rendering of the example in FIG. 13A.

FIG. 14B is a drawing showing a rendering of the example in FIG. 13B.

FIG. 15A is a drawing showing an example of a PDF description of a text object setting a ratio of a character width to each character in FIG. 13A.

FIG. 15B is a drawing showing an example of a PDF description of a text object setting a ratio of a character width to each character in FIG. 13B.

FIG. 16A is a drawing showing a rendering of the example in FIG. 15A.

FIG. 16B is a drawing showing a rendering of the example in FIG. 15B.

FIG. 17A is a drawing showing an example of a PDF description of a text object setting a text rise to each character in FIG. 15A.

FIG. 17B is a drawing showing an example of a PDF description of a text object setting a text rise to each character in FIG. 15B.

FIG. 18A is a drawing showing a rendering of the example in FIG. 17A.

FIG. 18B is a drawing showing a rendering of the example in FIG. 17B.

FIG. 19A is a drawing showing a part of an example of an image object of the produced electronic document.

DESCRIPTION OF THE EMBODIMENTS

Figure 1:
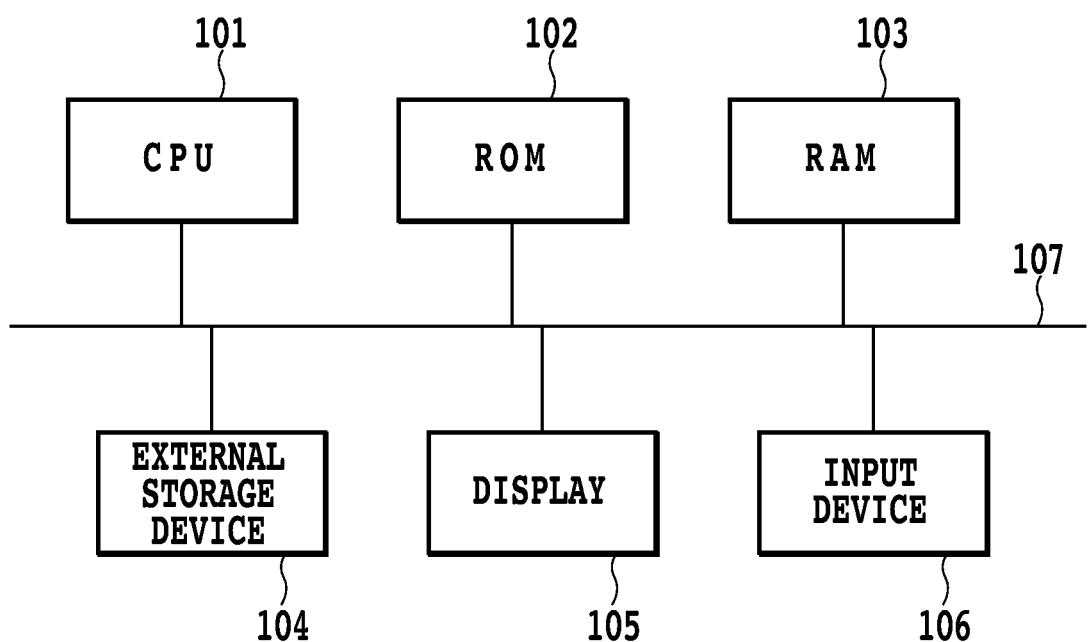
FIG. 1 is a block diagram showing an outline of an example of an electronic document producing device according to Embodiment 1.

FIG. 1 is a block diagram showing an outline of an example electronic document producing device according to Embodiment 1.

According to this embodiment, CPU 101 executes a control program stored in ROM 102 to perform control of the entire present device. ROM 102 stores therein a computer program executed by CPU 101 and various parameter data. The computer program may be executed by CPU 101 to operate the device (e.g., computer) as various means (e.g., each processing section) for executing each processing shown in one or more of the flow charts to be described later. It should be noted that in the present embodiment, the processing corresponding to each step of a flow chart (described later) may be realized by software using the computer (CPU), and a part or an entirety of the processing may also be realized by hardware such as an electronic circuit. Embodiments of the electronic document producing device of the present invention may be realized by using a general purpose personal computer, or may be realized as a device exclusive to electronic document producing.

In the embodiment as shown, RAM 103 stores therein images and various pieces of information. RAM 103 may serve as a work area of the CPU or as a temporal saving region of data.

An external storage device 104 may store various data, such as for example a dictionary. The external storage device 104 may include, for example, at least one of a hard disc, a CD-ROM and the like. A computer program having computer-executable instructions for making a computer realize functions according to aspects of the present invention may be stored in, for example, a computer-readable external storage medium, or may be supplied through network. A display 105 may be, for example, an LCD or a CRT.

An input device 106 according to this embodiment may be, for example, an interface for connecting an image input device, such as an interface for connecting to a digital camera or a scanner, or may be the image input device itself, such as a digital camera. In one version, for realizing a device according to aspects of the present invention as a part of a digital camera or a scanner, the device of the present invention may be incorporated into the digital camera or the scanner.

In the embodiment as shown, a network interface (I/F) 107 communicates with an external device (for example, at least one of a server, an external storage device, an image input device and the like) connected onto network to read or write programs or data. The network is typically a so-called communication network such as internet, LAN, WAN or telephone line, that is, for the transmission and reception of data. The display 105 or the input device 106 may be connected through the network interface 107.

Figure 2:
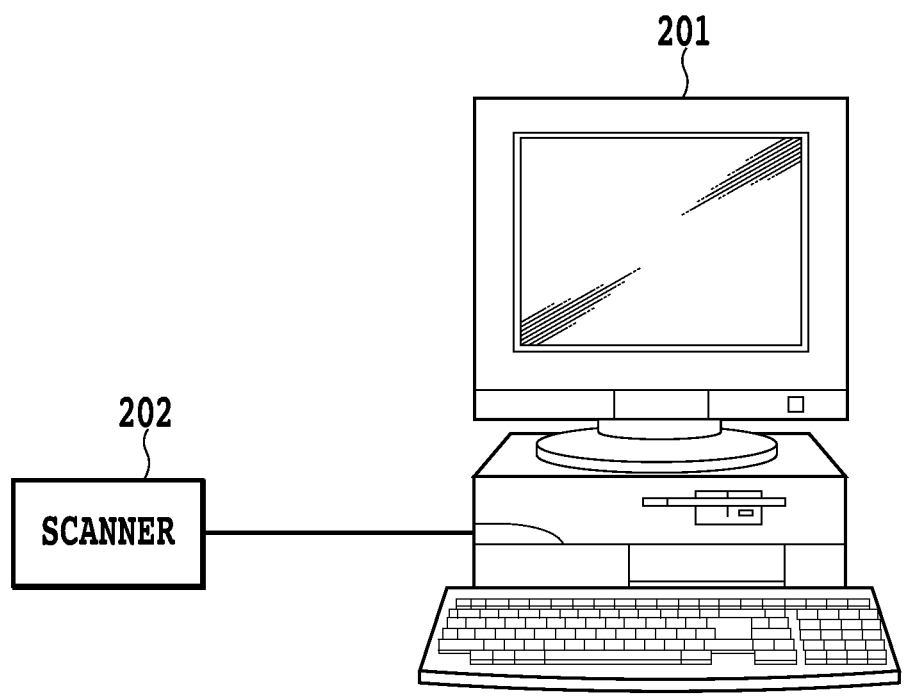
FIG. 2 is a system diagram showing an outline of an example of an electronic document producing device according to Embodiment 1.

In one version, such an electronic document producing device may be realized, for example, in a system as shown in the example of FIG. 2. FIG. 2 is a diagram showing an example of a computer system which can be adopted in Embodiment 1. A computer device 201 receives an image data photographed by a scanner 202 to execute the processing for electronic document production. It should be understood that embodiments of the electronic document producing device according to the present invention are not limited to this construction, and may also be constructed to be capable of, for example, producing an electronic document in a device housing a scanner therein (for example, a complex machine (MPF) or the like). An electronic document may be produced by using, for example, an image photographed by a digital camera or the like.

Figure 3:
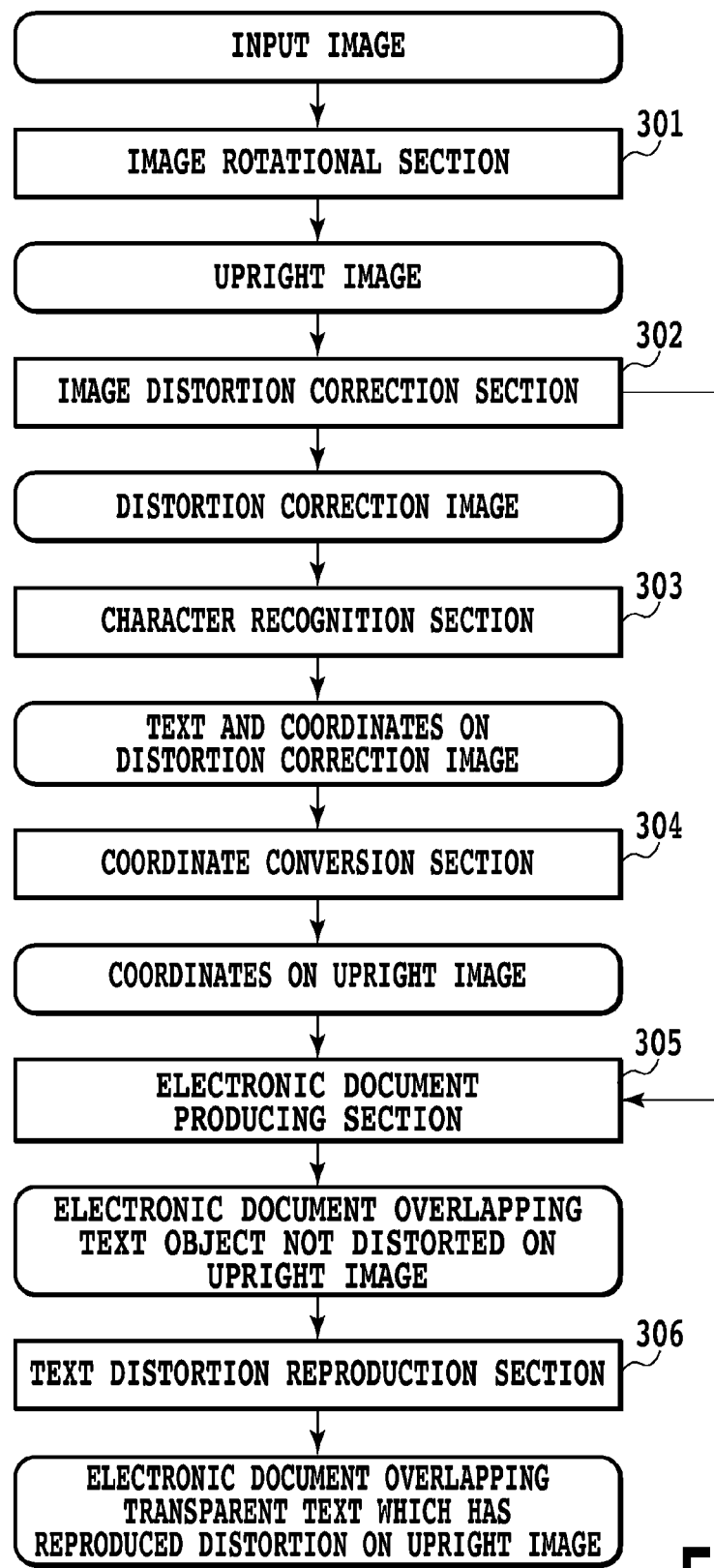
FIG. 3 is a block diagram showing an embodiment of electronic document producing processing.

Next, FIG. 3 shows a block diagram showing examples of each processing section at the time of executing the electronic document producing processing of Embodiment 1, as well as the data inputted and outputted at each processing section.

According to the embodiment as shown in FIG. 3, an image rotational section 301 rotates an entire input image in such a manner that a character image contained in the input image is put in a substantially upright position, thus obtaining an upright image. This may be executed by the processing of step S401 in FIG. 4, described below. The step S401 can be skipped, for example, when an input image is put in a substantially upright position before the step S401 is executed.

An image distortion correction section 302 performs distortion correction conversion to the upright image, thus obtaining a distortion correction image. This may be executed by the processing from step S402 to step S404 in FIG. 4, also described below.

A character recognition section 303 executes character recognition processing to the distortion correction image to obtain text data of the character recognition result and coordinates of the text on the distortion correction image. This may be executed by step S405 in FIG. 4 as described below.

A coordinate conversion section 304 converts the coordinates of the text of the character recognition result obtained at the character recognition section 303 on the distortion correction image into coordinates on the upright image before the distortion correction. This may be executed by step S406 in FIG. 4, described below.

An electronic document producing section 305 produces an electronic document from the upright image obtained at an image rotational section 301 and the text data of the character recognition result obtained at the character recognition section 303. Here, the text data located in each text region in the upright image is determined. This may be executed by step S407 to step S409 in FIG. 4, described below.

A text distortion reproducing section 306 finds a base line of a transparent character overlapped on the electronic document from the electronic document obtained at the electronic document producing section 305 and the coordinates obtained at the coordinate conversion section 304 to adjust a character width ratio and a relative position, thereby reproducing the distortion of the text. This may be executed by step S410 to step S415 in FIG. 4, described below.

Figure 4:
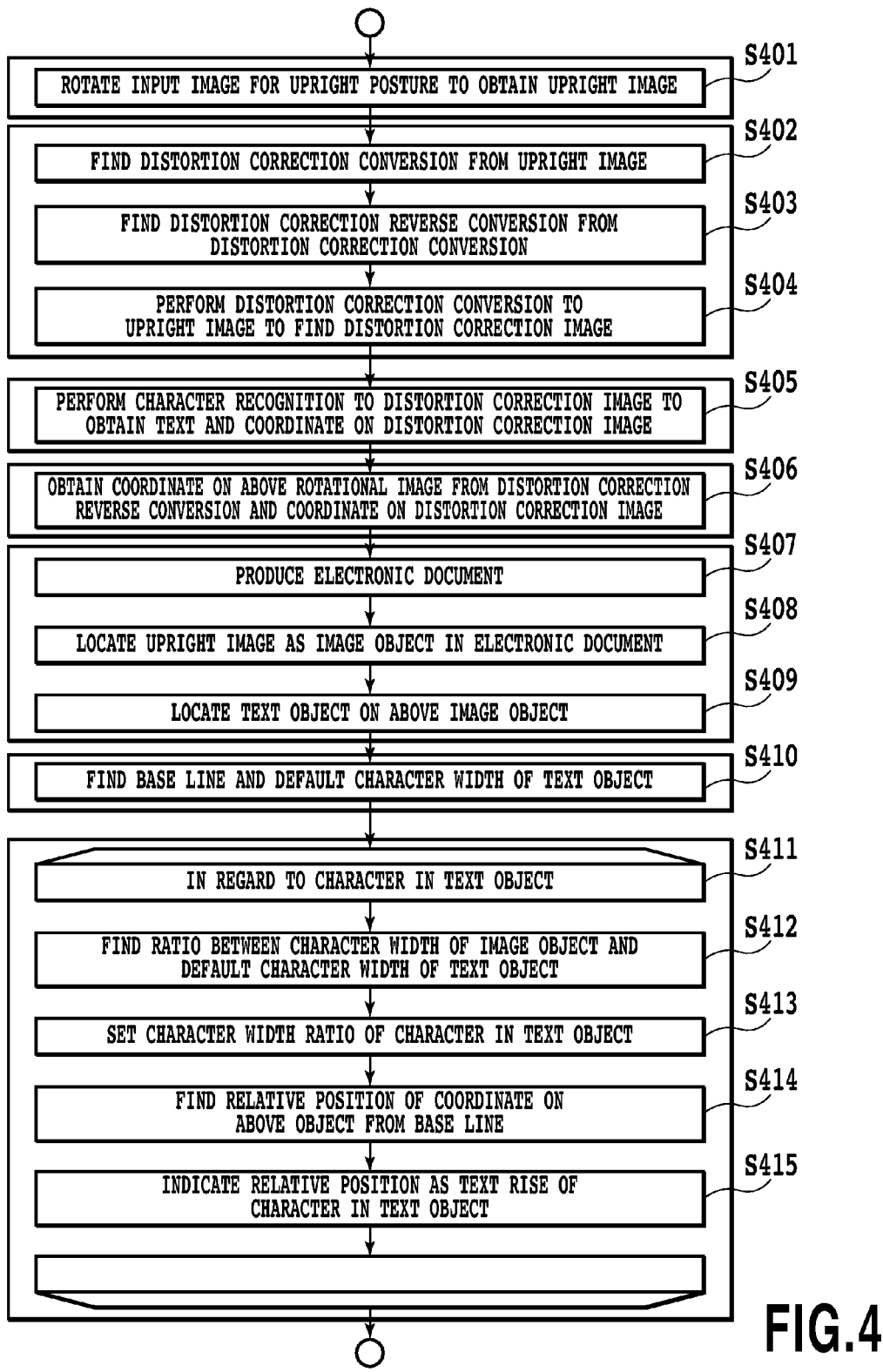
FIG. 4 is a flow chart showing an embodiment of electronic document producing processing.

Next, an example of a flow chart for processing in Embodiment 1 will be shown in FIG. 4.

Figure 5A:
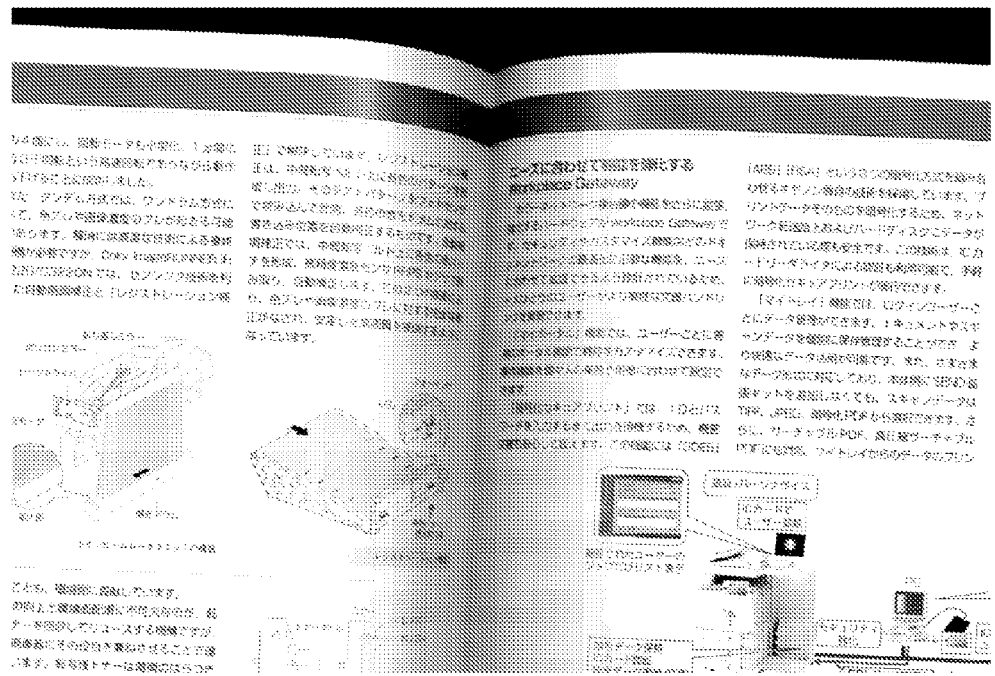
FIG. 5A is a drawing showing a part of an example of an input image.
Figure 5B:
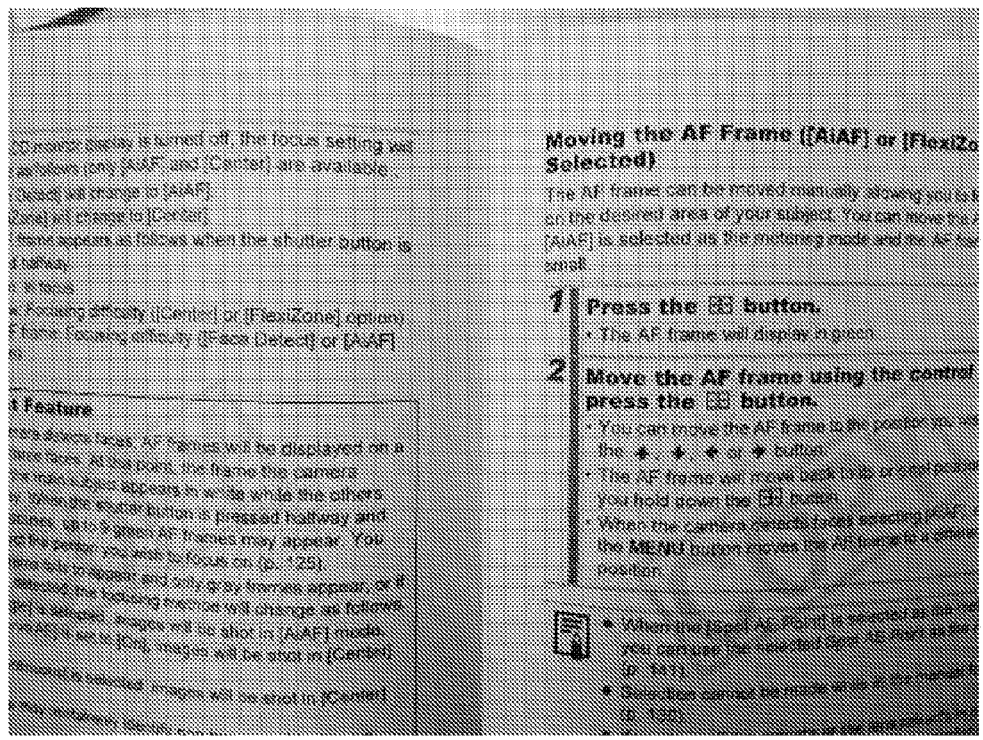
FIG. 5B is a drawing showing a part of an example of an input image.
Figure 6A:
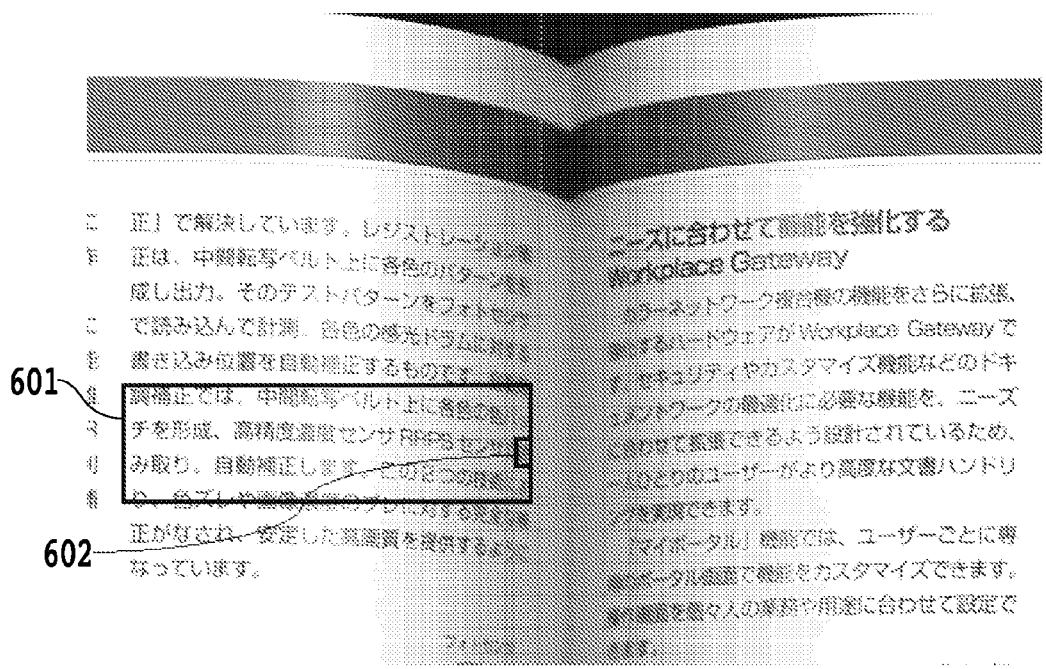
FIG. 6A is a drawing showing a part of an example of an upright image obtained by rotating the input image.
Figure 6B:
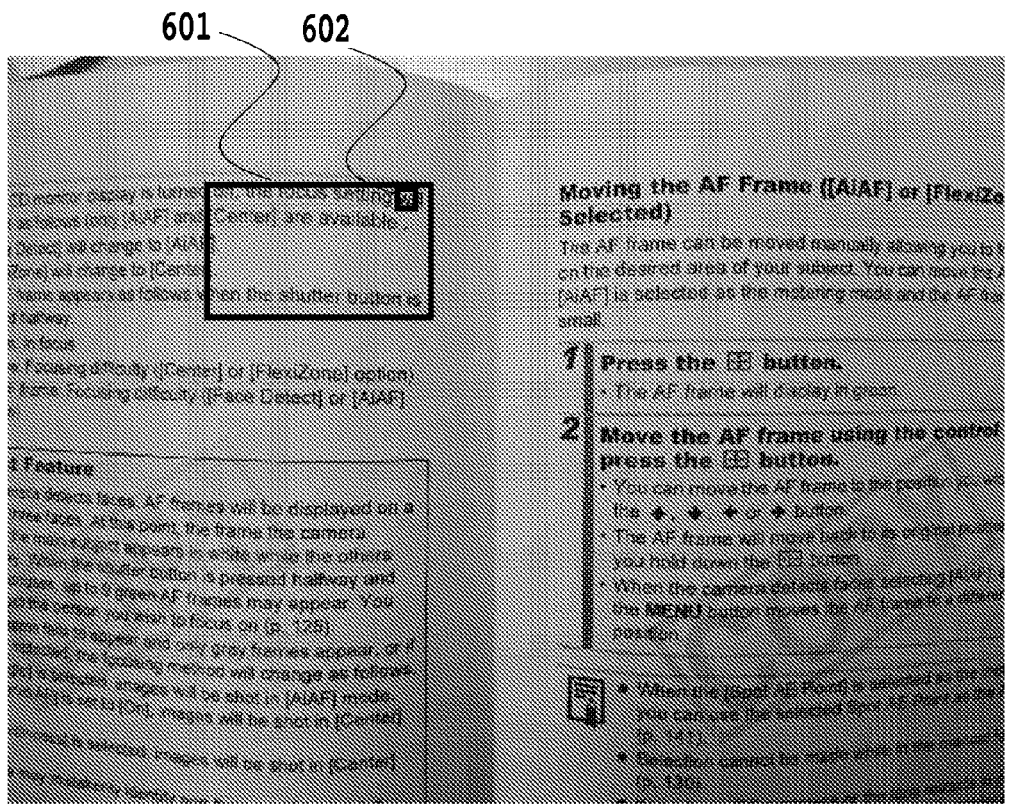
FIG. 6B is a drawing showing a part of an example of an upright image obtained by rotating the input image.

At step S401, the CPU 101 rotates an input image for the upright posture to obtain an upright image. FIGS. 5A and 5B each shows a part of an example of an input image according to Embodiment 1. FIG. 5A is an example of a document image described in Japanese and FIG. 5B is an example of a document image described in English. Since an entire image of this input image (all character images) is largely inclined, the character recognition processing can not be executed at this state. Therefore, the entire input image is rotated in such a manner that character lines other than character lines in a bind-in portion of a book are in a substantially upright position. FIGS. 6A and 6B each shows a part of the upright image obtained by rotating and converting the image in each of FIGS. 5A and 5B. It should be noted that a bit map conversion in which an error substantially does not occur may be used for rotation of the image. The rotational angle may be indicated by a user or may be automatically found. In a case of automatically finding the rotational angle, for example, the image in each of FIGS. 5A and 5B may be divided into small sections, and inclination angles of character lines contained in each small section may be found. Among the inclination angles obtained from each small section, the angle that appears the most frequently may be found as an inclination angle of the entire image.

Since in the upright image obtained at step S401, the distortion or the like in the bind-in portion of the book is left as it is, at step S402, the CPU 101 finds the distortion correction conversion (e.g., at least one of the correction formulas, coefficients, variables and the like, used at a correction time) for the above-obtained upright image. The distortion correction conversion may be intended to correct distortion portions in the image to provide the correct positions. This method of distortion correction may be the method as described in Japanese Patent Laid-Open No. S60-65668 (1985) or 2002-77578, or other distortion correction conversion method. However, the method also may involve finding a reverse conversion.

At step S403, the CPU 101 finds the distortion correction reverse conversion (e.g., a calculation formula for reverse conversion or the like) from the above-obtained distortion correction conversion (e.g., distortion correction calculation formula or the like).

Figure 7A:
FIG. 7A is a drawing showing a part of an example of a distortion correction image obtained by performing distortion correction conversion on the upright image.
Figure 8A:
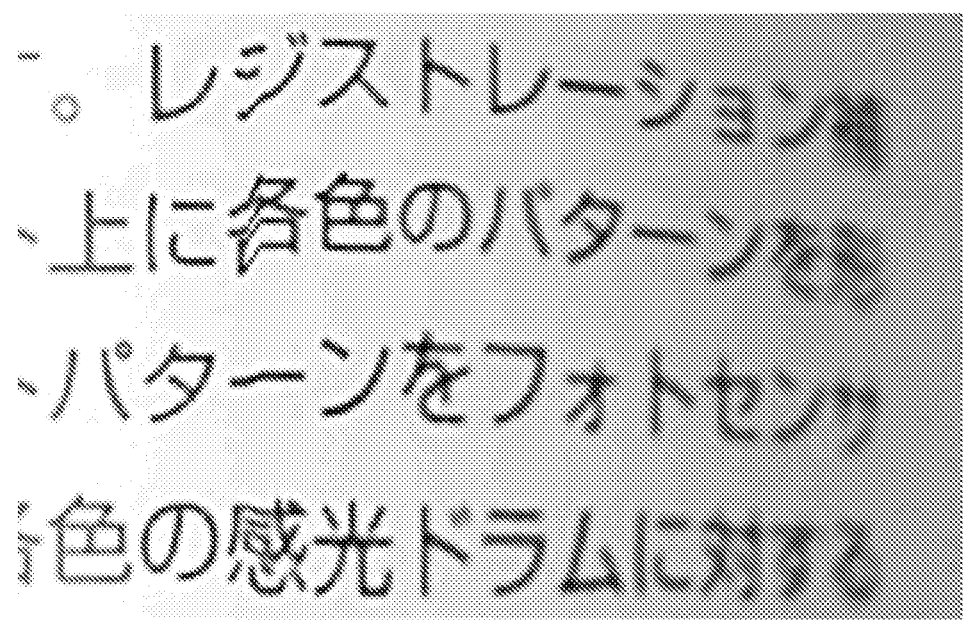
FIG. 8A is a drawing showing an example of distortion based upon a measurement error in the distortion correction image.
Figure 8B:
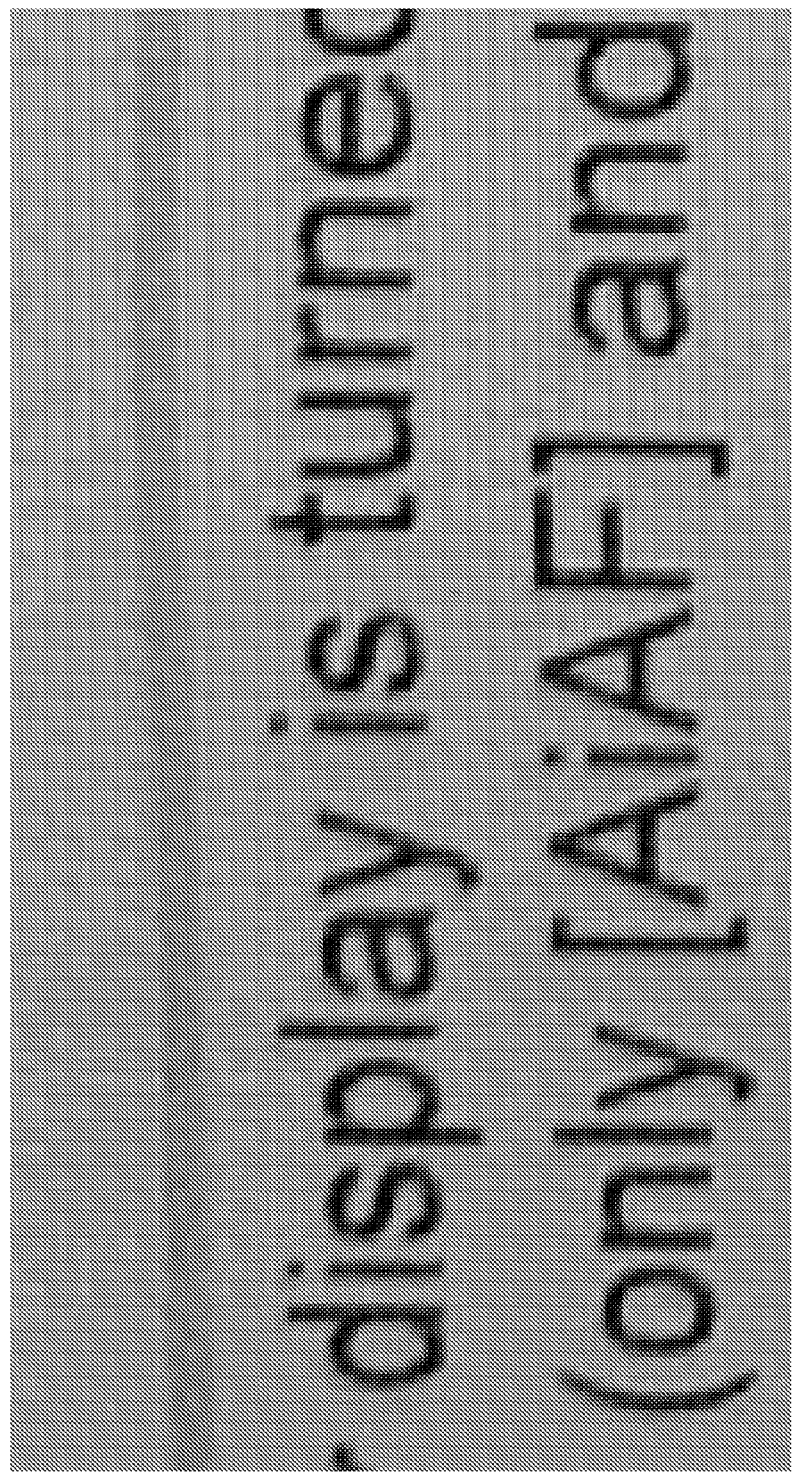
FIG. 8B is a drawing showing an example of distortion based upon a measurement error in the distortion correction image.
Figure 9A:
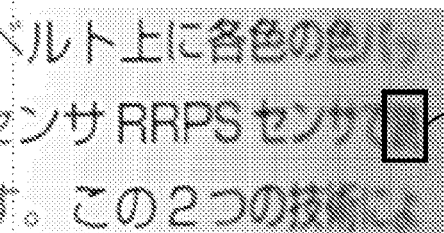
FIG. 9A is a drawing showing an example of a text region on the distortion correction image.
Figure 9B:
FIG. 9B is a drawing showing an example of a text region on the distortion correction image.

At step S404, the CPU 101 performs the distortion correction conversion obtained at step S402 on the upright image obtained at step S401 (i.e., the image obtained before the distortion correction) to obtain a distortion correction image (i.e., image obtained after the distortion correction). In a case of performing the distortion correction conversion on the examples of images in each of FIGS. 6A and 6B, a distortion correction image as shown in each of the examples in FIGS. 7A and 7B may be obtained. That is, FIG. 7A is an example of an image after the distortion correction of a document described in Japanese, and FIG. 7B is an example of an image after the distortion correction of a document described in English. Since a measurement error may occur in the measurement of distortion, the distortion tends to more easily occur in the distortion correction image based upon the measurement error. FIGS. 8A and 8B each shows an example of such distortion that may occur after the correction. As shown in each of FIGS. 8A and 8B, since the distortion occurring after correction that is due to the measurement error or the like is a relatively unnatural distortion, a user may perceive the distortion as excessively unnatural and/or disorienting, so that the image may be difficult to recognize. That is, for a user, the upright image in which the more natural distortion remains (e.g., at the bind-in portion of a book or the like), as shown for example in each of FIGS. 6A and 6B, may be more easily recognized than the distortion correction image in which the more unnatural distortion occurs, as shown for example in each of FIGS. 8A and 8B. However, at the time of executing the character recognition processing, in a state where the more natural distortion remains, as shown in the examples of each of FIGS. 6A and 6B, the character recognition accuracy in the entire document may tend to be more easily deteriorated due to a failure of the character extraction processing at the bind-in portion. That is, for the character recognition processing, in many cases, the distortion correction image as shown in each of FIGS. 7A and 7B (and correspondingly each of FIGS. 8A and 8B) is more appropriate for such processing than the upright image where the distortion as shown in each of FIGS. 6A and 6B remains.

At step S405, the CPU 101 executes the character recognition processing on the distortion correction image to find the text of the character recognition result and the coordinates on the distortion correction image. A text region 701 on the distortion correction image as shown in the examples of each of FIGS. 7A and 7B is shown in each of FIGS. 9A and 9B, and FIGS. 10A and 10B each shows an example of the text obtained therefrom. It should be noted that a character recognition technology can be used for the character recognition processing. Hereinafter, coordinates on the distortion correction image in Embodiment 1 are designed to be obtained as position coordinates of a text region constructed from a plurality of character images and position coordinates of each character image, but are not limited thereto.

At step S406, the CPU 101 obtains coordinates on the upright image corresponding to that obtained before the distortion correction based upon the distortion correction reverse conversion (e.g., reverse conversion formula) obtained at step S403 and the coordinates on the distortion correction image obtained at step S405. For example, when reverse conversion of coordinates of each apex in the text region 701 shown in the examples of each of FIGS. 7A and 7B is performed to find a circumscribed rectangle surrounding the apex coordinates after the reverse conversion, a region 601 shown in the examples of each of FIGS. 6A and 6B may be obtained. In addition, when the reverse conversion is performed on coordinates of each apex of a rectangle surrounding a character 901 shown in the examples of each of FIGS. 9A and 9B, the rectangle surrounding the apex coordinates of the reverse conversion result is obtained as coordinates of a character 602 as shown in the examples of each of FIGS. 6A and 6B.

At step S407, the CPU 101 produces an electronic document. It should be noted that this electronic document may be a document in which at least an image object and a character object exist and are overlapped on the same coordinates, and also the character object can be treated as a searchable and non-displayed character object (e.g., a transparent object). In one version according to Embodiment 1, a PDF document is produced.

At step S408, the CPU 101 locates the upright image as an image object in the electronic document. For example, the upright image as shown in the examples of each of FIGS. 6A and 6B may be located.

At step S409, the CPU 101 determines a text object (e.g., text data corresponding to the character recognition result) located at the coordinates of each text region obtained at step S406. For example, in the examples of each of FIGS. 6A and 6B, the text object located in the text region 601 may be determined. In addition, the text data located in each text region may be described in the PDF document so as to be overlapped as transparent characters for rendering on the image object located at step S408.

Figure 11A:
FIG. 11A is an enlarged drawing showing a region 601 in FIG. 6A.
Figure 11B:
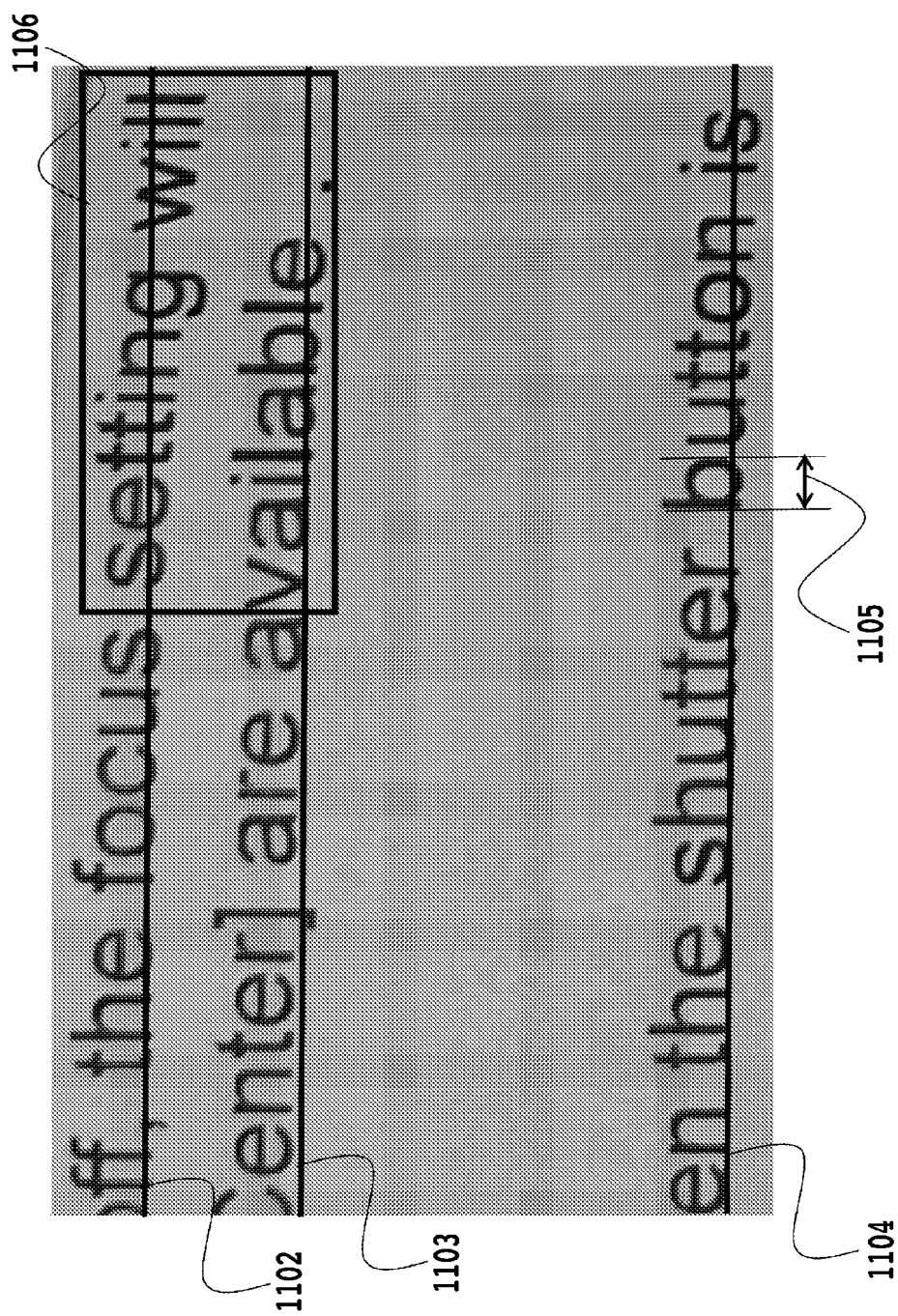
FIG. 11B is an enlarged drawing showing a region 601 in FIG. 6B.

At step S410, CPU 101 finds a default base line and a default character width of each character row in regard to the text object determined in location at step S409. In addition, the information of the default base line and the default character width is described in the electronic document. The default base line may be, for example, equal to a base line which the most characters have in the same row. The default character width may be, for example, equal to a character width which the most characters have in the same row. For example, in the region 601 shown in each of FIGS. 6A and 6B, as shown in each of FIGS. 11A and 11B, the base lines may correspond to base lines 1101 to 1104, and the default character width may correspond to, for example, a default character width 1105. FIG. 11A is an example of a document described in Japanese and FIG. 11B is an example of a document described in English. In a case of setting the base lines 1101 to 1104 and the default character width 1105 to the text object for which the location has been determined at step S409, a part of the PDF description of the text object may be as shown in the examples of each of FIGS. 13A and 13B. It should be noted that the example in FIG. 13A is, for simplification of the illustration, a diagram extracting and showing a part of the document description example, and portions surrounded by marks of < . . . > show character codes. The example in FIG. 13B is also a diagram extracting and showing a part of the document description example, and portions surrounded by marks of "( )" show characters (i.e., character codes). It should be noted that the example in FIG. 13B also, for simplification of the illustration, omits a part of the description. If rendering to the PDF description as shown in the examples of each of FIGS. 13A and 13B is made, the result of the rendering may be as shown in the examples of each of FIGS. 14A and 14B. In the examples of each of FIGS. 14A and 14B, the rendering is made by the default base line and the default character width as determined in the examples of each of FIGS. 11A and 11B and therefore, each character row is located substantially linearly. It should be noted that each of FIGS. 13A and 14A is an example of a document described in Japanese and each of FIGS. 13B and 14B is an example of a document described in English.

Step S411 shows an end of a loop in which the CPU 101 repeatedly executes the processing from step S412 to steps 415 in regard to each character in the text object. When the loop processing from step S412 to step S415 is completed, the electronic document of Embodiment 1 is produced.

At step S412, the CPU 101 finds a ratio between a character width of each character image object and a default character width in the text region. An enlarged diagram of a region 1106 shown in the examples of each of FIGS. 11A and 11B is shown in the examples of each of FIGS. 12A and 12B. At step S412, for example, a ratio between a character width 1202 of a character 1201 and a default character width 1105 of a text object may be found.

At step S413, the CPU 101 sets the character width ratio obtained at step S412 to each character in the text object. FIGS. 15A and 15B each shows examples of a part of the PDF description of the text object in which the character width ratio is set to each character in the text object shown in the examples of each of FIGS. 13A and 13B. In addition, in a case of performing the rendering to an example in each of FIGS. 15A and 15B, the rendering result is as shown in the examples of each of FIGS. 16A and 16B. In FIGS. 15A and 15B showing the PDF description example, the character width ratio set to each character is a value following a descriptor Tj. It should be noted that description of the character width ratio is omitted for the character having a width equal to the default character width.

At step S414, the CPU 101 finds a relative position (e.g., a deviation amount) from a base line of the text object to position coordinates of each character image. For example, in regard to the character 1201 shown in the examples of each of FIGS. 12A and 12B, a relative position 1203 from the base line 1102 obtained at step S410 is found.

At step S415, CPU 101 indicates the relative position found at step S414 as the text rise of the character in the text object. When the text rise is set to the PDF description example of the text object as shown in the examples of each of FIGS. 15A and 15B, the set result is as shown in the examples of each of FIGS. 17A and 17B. In a case of performing rendering of the text object description as shown in the examples of each of FIGS. 17A and 17B, the rendering result may be as shown in the examples of each of FIGS. 18A and 18B. It should be noted that in the examples of each of FIGS. 17A and 17B showing the PDF description example, the set text rise is a value which is described before a descriptor Ts.

Figure 19B:
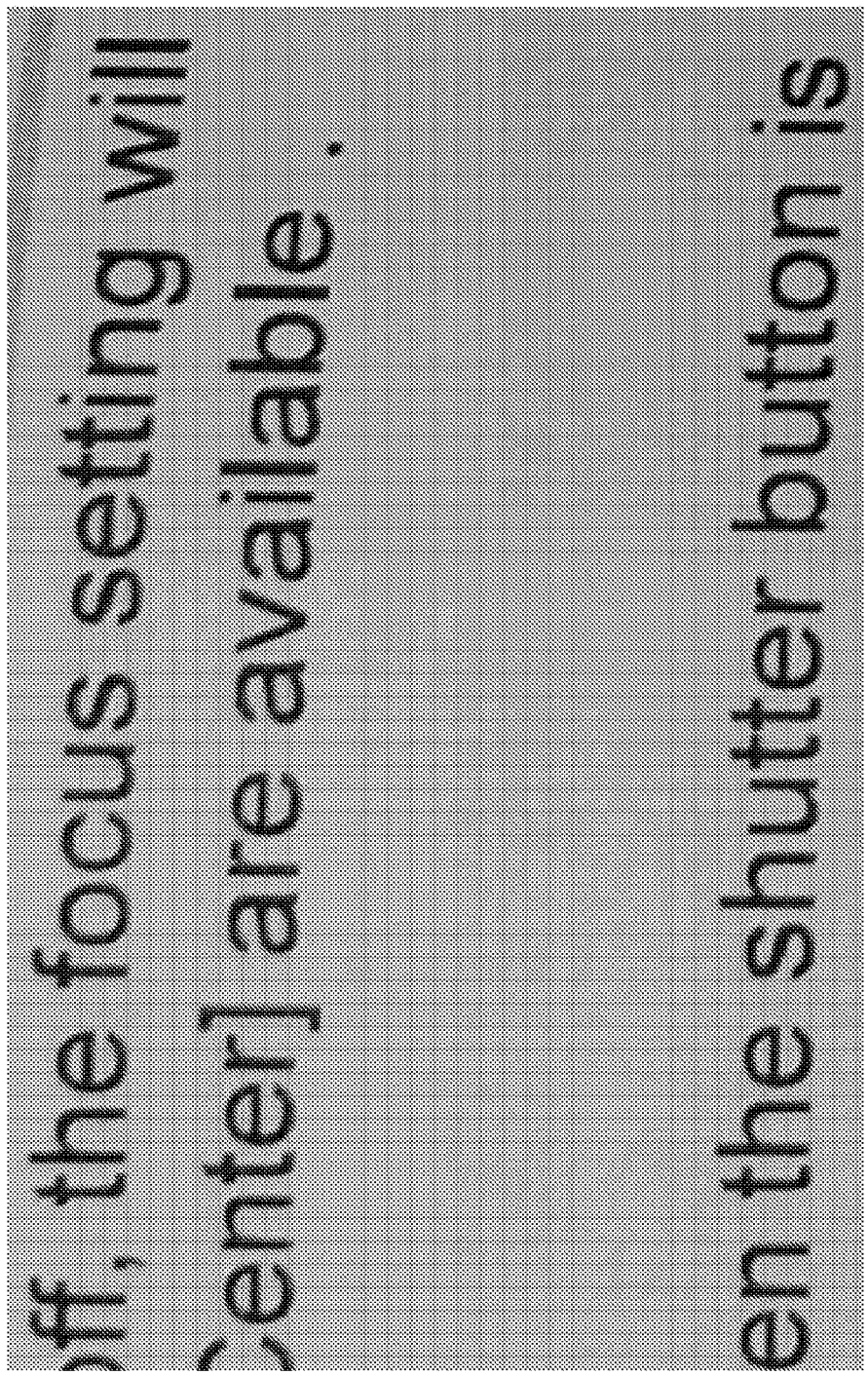
FIG. 19B is a drawing showing a part of an example of an image object of the produced electronic document.

The electronic document produced according to the embodiment as described above is a PDF document described in such a manner that the text object as shown in the example of each of FIGS. 18A and 18B is overlapped with and located as transparent characters on an image object as shown in the examples of each of FIGS. 19A and 19B. In this produced document, a drawing position of each character of the text object is described as a relative position to the base line by using the description of the text rise.

Figure 20A:
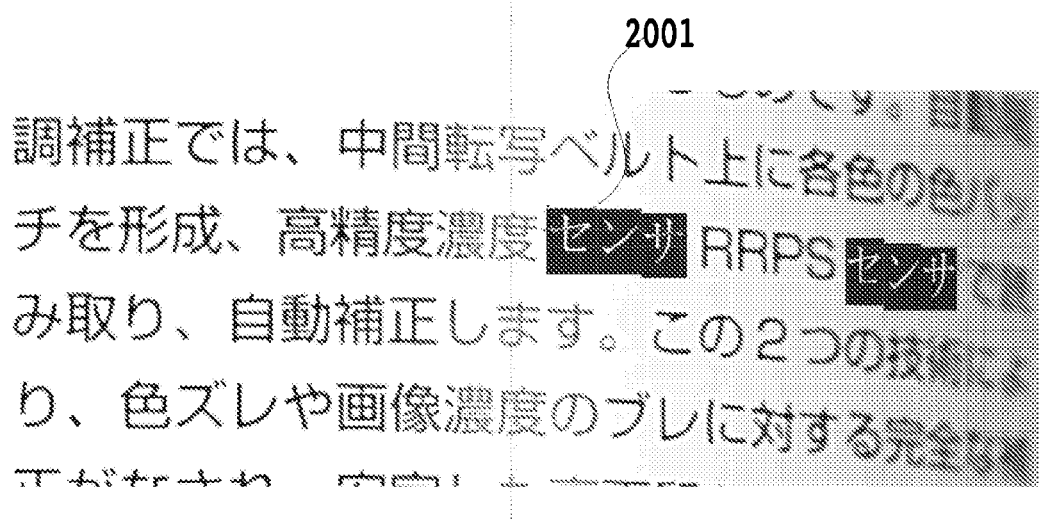
FIG. 20A is a drawing showing an example of an output in a case of searching for the word "sensor" by software displaying the electronic document.
Figure 20B:
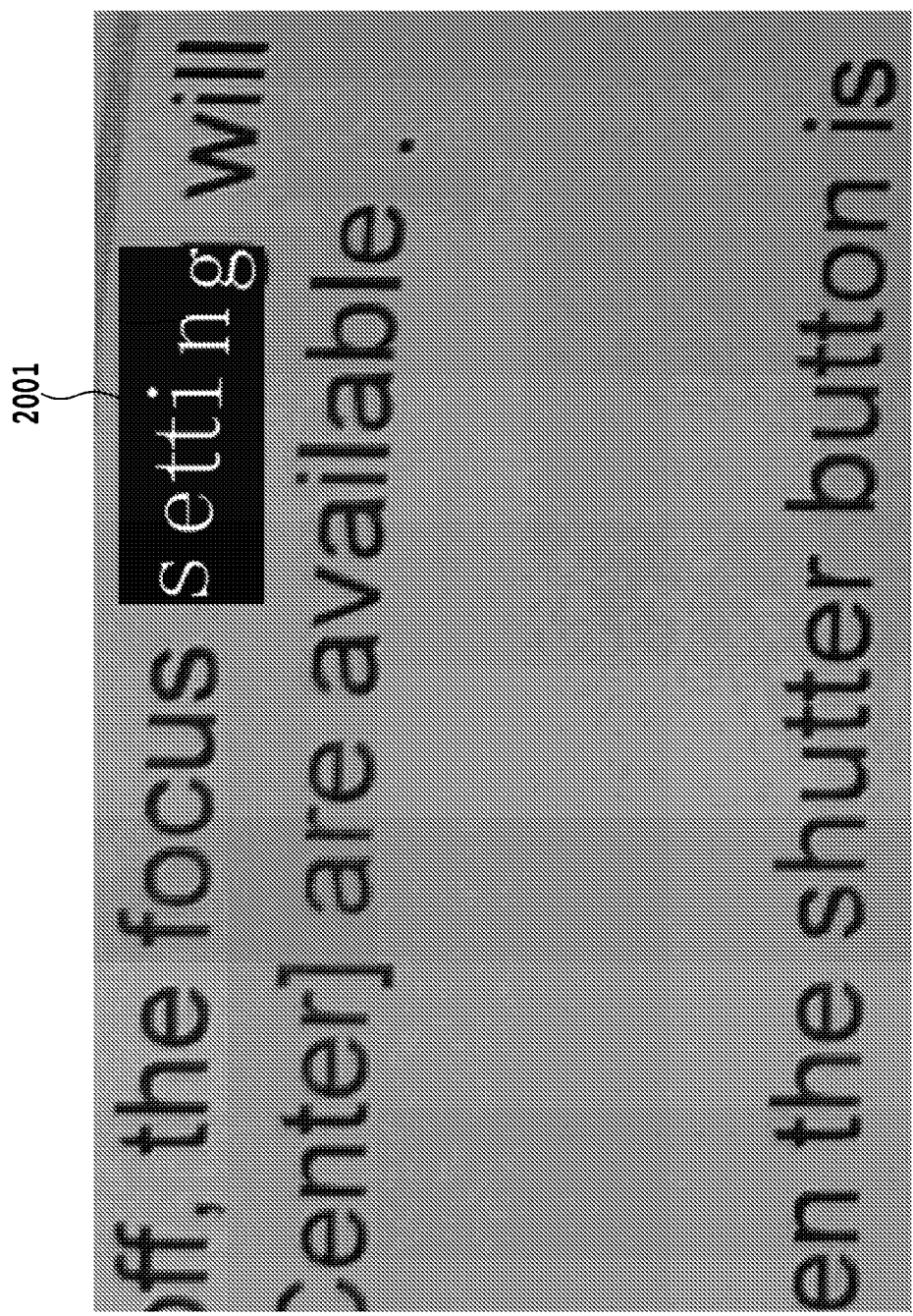
FIG. 20B is a drawing showing an example of an output in a case of searching for the word "setting" by software displaying the electronic document.

In addition, FIG. 20A shows an example of the output in a case of searching for the Japanese word for "sensor" in software (for example, Acrobat Reader® of Adobe® Company or the like) displaying the electronic document thus produced. FIG. 20B shows an example of the output in a case of searching for the English word for "setting". As a result, in Embodiment 1, when an electronic document is searched, since a character code of a transparent character overlapped on an upright image is searched, the character is displayed as if the corresponding location 2001 of the upright image has been searched.

As described above, in the present embodiment, since the character recognition is performed by using an image in which the distortion is corrected, it is possible to improve a character recognition rate (e.g., character recognition accuracy) of an entire document image. On the other hand, an image used for display uses an image obtained before distortion correction (e.g., and image of which only rotation causing almost no image quality degradation is made), and therefore, a display of an image in which an image quality degradation may occur, which image may be perceived as unnatural or disorienting, can be prevented. In addition, in text searching, a position corresponding to that on an image before the distortion correction has been made is reversely displayed and therefore, the search can be treated as if the text search to the image is made.

Figure 12A:
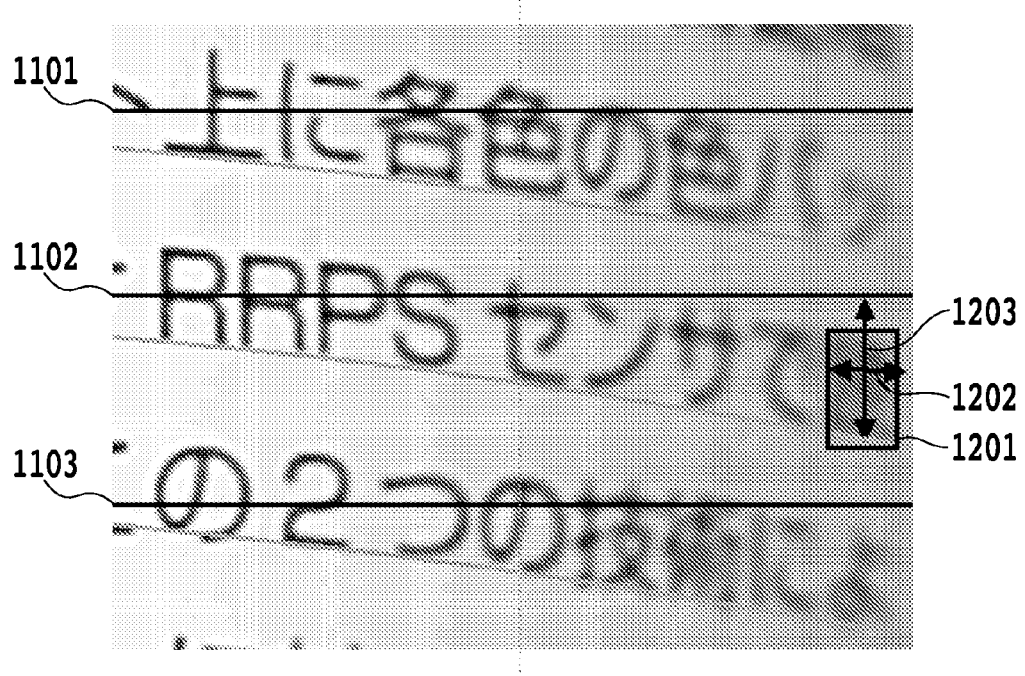
FIG. 12A is an enlarged drawing showing a region 1106 in FIG. 11A.
Figure 12B:
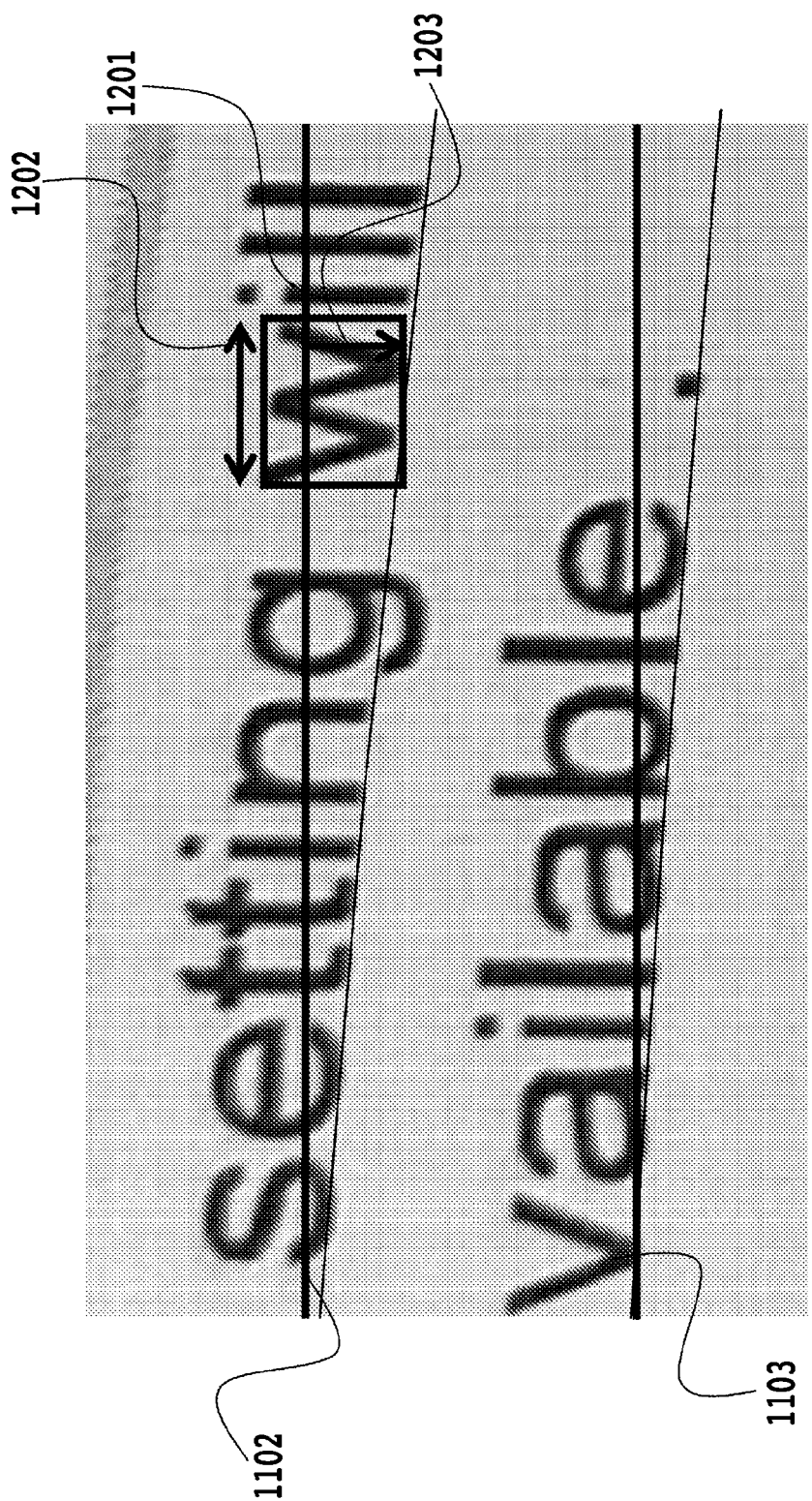
FIG. 12B is an enlarged drawing showing a region 1106 in FIG. 11B.

In addition, when the position of the character 1201 in the examples of each of FIGS. 12A and 12B is described by absolute coordinates as it is, since the character 1201 is positioned between the base line 1102 and the base line 1103, it is not easy to clarify which character row the character 1201 belongs to. However, according to aspects of the present embodiment, since the position of the character 1201 is described at the relative position from the base line by using the description of the text rise, it is apparent that the character 1201 belongs to the character row of the base line 1102. That is, the character line belonging to the same row on the image is constructed to belong to one row even in the electronic document description. Therefore, this construction may prevent the event where it is determined that the character belongs to a different character row and therefore, the character is missed during searching. Furthermore, at the time of copying or pasting the text in the electronic document, the accurate new line information can be retained.

In addition, while Embodiment 1 shows an example of the PDF document production, aspects of the invention are also applicable to production of an electronic document in a format other than PDF (for example, a XPS (XML PAPER SPECIFICATION) document).

Furthermore, in Embodiment 1, at step S410 a character interval (e.g., a character spacing amount in a horizontal direction) may be found from position coordinates of each character in a horizontal direction, thereby describing the character interval in an electronic document. This character interval may be found at each character, describing it. In addition, the average character interval may also be found as a default character interval, describing the character by using the default character interval.

Accordingly, aspects of the invention may provide an electronic document that can display an image that is relatively easy to recognize by a user, while also maintaining character recognition accuracy. Embodiments of the invention may also allow for the performing of a text search even in a case where a character recognition result is embedded in a format mode such as PDF (Portable Document Format).

According to an embodiment of the present invention, upon searching the electronic document produced based upon a method in accordance with present invention, a display of the search result may be possible on an image in which distortion has not been corrected. In addition, since character recognition may be performed by using an image in which distortion has been corrected, it may be possible to improve a character recognition rate (e.g., character recognition accuracy) of an entire document image. Furthermore, since an image obtained before distortion correction may be used as an image for display, this may prevent a display of an image in which image quality degradation occurs due to a distortion correction error, which could otherwise appear unnatural and/or disorienting to a user. Furthermore, since each piece of text data belonging to a character row may be described by using the relative position from the base line, the character row to which each text data piece belongs may be clarified to improve accuracy in searching or copying.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-037774, filed Feb. 19, 2008, which is hereby incorporated by reference herein in its entirety.

What is claimed is:

1. An electronic document producing device comprising:
    a correcting unit for correcting distortion of a first image to obtain a correction image;
    a character recognition unit for executing character recognition processing on a plurality of character images contained in the correction image to obtain text data;
    a unit for finding linear base lines for character rows included in the first image;
    a unit for finding, in the first image, a position of each character image relative to the linear baseline found for each character row based upon position coordinates of each character image in the first image; and
    a producing unit for producing an electronic document including the text data and the first image,
    wherein a drawing position of the text data is described in the electronic document based upon the found position of each character image relative to the linear base line.

2. An electronic document producing device according to claim 1, further comprising:
    a rotational unit for rotating an input image to obtain an upright image, wherein the first image is the upright image obtained by the rotational unit.

3. An electronic document producing device according to claim 1,
    wherein the producing unit produces the electronic document containing the text data that overlaps with the first image as a transparent character, and
    wherein the drawing position of the text data is described in the electronic document based upon the found position of each character image relative to the linear base line.

4. An electronic document producing device according to claim 1, wherein the producing unit produces the electronic document containing the text data described based upon the found position of each character image relative to the linear base line by using the description of a text rise.

5. An electronic document producing device according to claim 1, further comprising:
    a reverse conversion unit for performing distortion correction reverse conversion to position coordinates of each character image contained in the correction image to find position coordinates of each character image in the first image,
    wherein the position of each character image relative to the linear base line is found based upon the position coordinates of each character image in the first image found by the reverse conversion unit.

6. An electronic document producing device according to claim 1, further comprising:
    a unit for finding a default character width of the character images; and
    a unit for finding a ratio between a character width of each character image in the first image and the default character width,
    wherein the producing unit describes the drawing position of the text data on the first image based upon the position of each character image relative to the linear base line, and produces the electronic document containing the text data describing the character width using the ratio to the default character width.

7. An electronic document producing device according to claim 1, wherein the electronic document produced by the producing unit is a PDF document.

8. An electronic document producing method comprising:
    correcting distortion of a first image to obtain a correction image;
    executing character recognition processing on a plurality of character images contained in the correction image to obtain text data;
    finding linear base lines for character rows included in the first image;

finding, in the first image, a position of each character image relative to the linear base line found for each character row based upon position coordinates of each character image in the first image; and producing an electronic document including the text data and the first image, wherein a drawing position of the text data is described in the electronic document based upon the found position of each character image relative to the linear base line.

9. A non-transitory computer readable storage medium for storing computer-executable instructions for controlling a computer to execute an electronic document producing method, the computer readable storage medium comprising:

computer-executable instructions for correcting distortion of a first image to obtain a correction image;

computer-executable instructions for executing character recognition processing on a plurality of character images contained in the correction image to obtain text data;

computer-executable instructions for finding linear base lines for character rows included in the first image;

computer-executable instructions for finding, in the first image, a position of each character image relative to the linear base line found for each character row based upon position coordinates of each character image in the first image; and computer-executable instructions for producing an electronic document including the text data and the first image, wherein a drawing position of the text data is described in the electronic document based upon the found position of each character image relative to the linear base line.

\* \* \* \* \*